United States Patent
Ishioka et al.

(10) Patent No.: US 11,097,729 B2
(45) Date of Patent: Aug. 24, 2021

(54) VEHICLE CONTROL DEVICE

(71) Applicant: HONDA MOTOR CO., LTD., Tokyo (JP)

(72) Inventors: Atsushi Ishioka, Wako (JP); Kanta Tsuji, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 6 days.

(21) Appl. No.: 16/725,520

(22) Filed: Dec. 23, 2019

(65) Prior Publication Data

US 2020/0207345 A1 Jul. 2, 2020

(30) Foreign Application Priority Data

Dec. 26, 2018 (JP) .............................. JP2018-243092

(51) Int. Cl.
*B60W 50/08* (2020.01)
*B60W 30/14* (2006.01)
*B60W 60/00* (2020.01)

(52) U.S. Cl.
CPC .......... *B60W 30/143* (2013.01); *B60W 50/08* (2013.01); *B60W 60/0027* (2020.02); *B60W 2540/223* (2020.02); *B60W 2554/804* (2020.02); *B60W 2720/106* (2013.01); *B60W 2754/50* (2020.02)

(58) Field of Classification Search
CPC ............... B60W 30/143; B60W 50/08; B60W 60/0027; B60W 2554/804; B60W 2754/50; B60W 2540/223; B60W 2720/106; B60W 30/09; B60W 30/18018; B60W 40/02
See application file for complete search history.

(56) References Cited

U.S. PATENT DOCUMENTS 10,576,964 B2   3/2020 Kumazaki et al.
2018/0141540 A1* 5/2018 Kumazaki ............. B60W 10/04

FOREIGN PATENT DOCUMENTS

| JP | H10-166895 | 6/1998 | |
| JP | 2006-347508 A | 12/2006 | |
| JP | 2008-110688 A | 5/2008 | |
| JP | 2008110688 A * | 5/2008 | |
| JP | 2016-074346 A | 5/2016 | |
| JP | 2016-159761 A | 9/2016 | |
| JP | 2018-080814 A | 5/2018 | |
| WO | 2018/221350 A1 | 12/2018 | |
| WO | WO-2018221350 A1 * | 12/2018 | ............... B62D 1/04 |

OTHER PUBLICATIONS

English_Translation_WO2018221350A1 (Year: 2018).*
English_Translation_JP2008110688A (Year: 2008).*
Office Action dated Aug. 11, 2020 issued over the corresponding Japanese Patent Application No. 2018-243092 with the English translation thereof.
Office Action dated Apr. 6, 2021 issued over the corresponding Japanese Patent Application No. 2018-243092 with the English translation thereof.

* cited by examiner

*Primary Examiner* — Peter D Nolan
*Assistant Examiner* — Ashley L Redhead, Jr.
(74) *Attorney, Agent, or Firm* — Carrier Blackman & Associates, P.C.; Joseph P. Carrier; Jeffrey T. Gedeon

(57) ABSTRACT

In start control, a travel control unit makes a first acceleration in a first control state set by a control state setting unit, lower than a second acceleration in a second control state set by the control state setting unit. A burden on a vehicle occupant in the second control state is larger than that in the first control state.

4 Claims, 6 Drawing Sheets

| CONTROL STATE | CATEGORY | EYES-ON | | EYES-OFF | |
|---|---|---|---|---|---|
| | | HANDS-ON | HANDS-OFF | HANDS-ON | HANDS-OFF |
| CONTROL STATE A (VEHICLE SPEED CONTROL ASSIST) | ASSISTED DRIVING | PERMITTED UNDER PREDETERMINED CONDITION | NOT PERMITTED | NOT PERMITTED | NOT PERMITTED |
| CONTROL STATE B (TRAVEL ASSIST IN SINGLE LANE) | ASSISTED DRIVING | | | | |
| CONTROL STATE C (AUTOMATED TRAVEL IN SINGLE LANE) (HANDS-ON REQUIRED) | AUTOMATED DRIVING | | | | |
| CONTROL STATE D (AUTOMATED TRAVEL IN SINGLE LANE) (HANDS-OFF PERMITTED) | AUTOMATED DRIVING | PERMITTED | PERMITTED | PERMITTED | PERMITTED |
| CONTROL STATE E (AUTOMATED TRAVEL) | AUTOMATED DRIVING | PERMITTED | PERMITTED | PERMITTED | PERMITTED |

VEHICLE CONTROL DEVICE

CROSS-REFERENCE TO RELATED APPLICATION

This application is based upon and claims the benefit of priority from Japanese Patent Application No. 2018-243092 filed on Dec. 26, 2018, the contents of which are incorporated herein by reference.

BACKGROUND OF THE INVENTION

Field of the Invention

The present invention relates to a vehicle control device that performs driving operation of a host vehicle partially or entirely on the basis of a control state that is set.

Description of the Related Art

A vehicle control device that performs driving operation of a host vehicle partially or entirely on the basis of a control state that is set has been recently developed. Japanese Laid-Open Patent Publication No. 2016-159761 discloses a device for preventing the contact between a vehicle and an obstacle by automatically suppressing the driving force generated by an engine when the vehicle starts to travel. If it is determined that there is no obstacle ahead of the vehicle, this device drives the engine with the required driving force in accordance with the opening of an accelerator, and if it is determined that there is an obstacle ahead of the vehicle, this device drives the engine with the driving force smaller than the required driving force.

SUMMARY OF THE INVENTION

A vehicle occupant may need to deal with an emergency situation while a vehicle control device performs start control. However, in the control performed by the vehicle control device, the vehicle occupant tends to be less concentrated on the travel of a host vehicle. For example, the vehicle occupant may fail to look ahead. When such a vehicle occupant needs to deal with the emergency situation, the host vehicle travels a long distance before the vehicle occupant starts to perform driving operation.

The present invention has been made in view of such a problem, and an object is to provide a vehicle control device that can start a vehicle at acceleration in accordance with a control state of the host vehicle.

An aspect of the present invention is a vehicle control device that performs driving operation of a host vehicle partially or entirely on a basis of a plurality of control states that are set, the vehicle control device including: a preceding vehicle recognition unit configured to recognize a preceding vehicle ahead of the host vehicle and behavior of the preceding vehicle; a travel control unit configured to, if the preceding vehicle recognition unit recognizes that the preceding vehicle starts to travel, perform start control of the host vehicle; and a control state setting unit configured to select and set one of the control states in which burdens on a vehicle occupant are different, wherein in the start control, the travel control unit is configured to make an acceleration in a first control state set by the control state setting unit, lower than an acceleration in a second control state set by the control state setting unit, the burden on the vehicle occupant in the second control state being larger than that in the first control state.

According to the present invention, the vehicle can start to travel at the acceleration in accordance with the control state of the host vehicle.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

A preferred embodiment of a vehicle control device according to the present invention is hereinafter described in detail with reference to the attached drawings.

[1. Overview of Vehicle Control Device 10]

Figure 1:
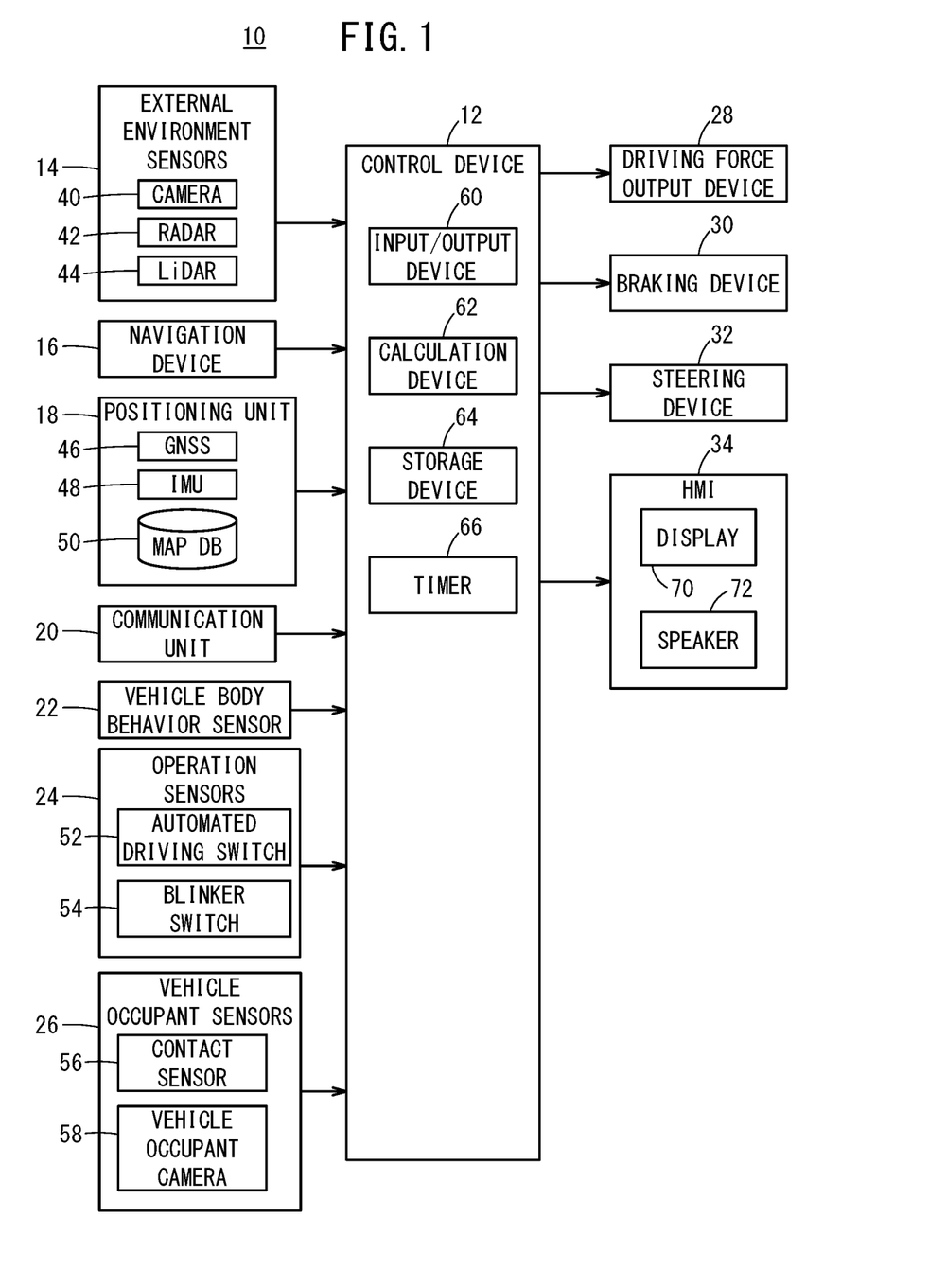
FIG. 1 is a block diagram of a vehicle control device according to a present embodiment.
Figure 3A:
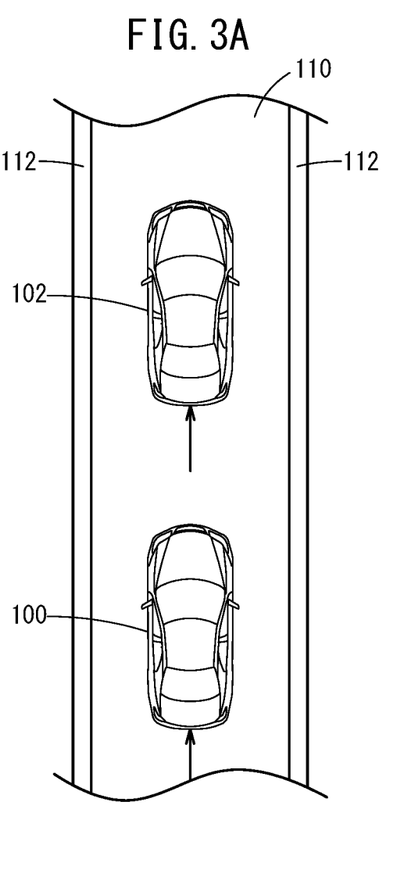
FIG. 3A is a state explanatory diagram describing a case where a host vehicle stops.
Figure 3B:
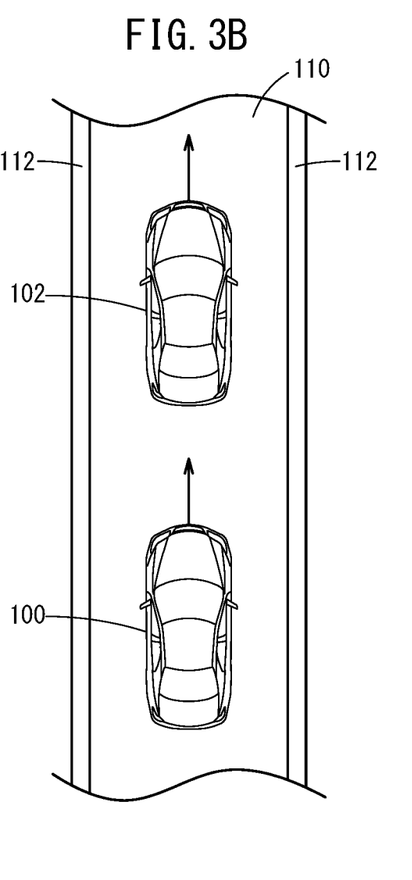
FIG. 3B is a state explanatory diagram describing a case where the host vehicle starts to travel.

A vehicle control device 10 illustrated in FIG. 1 can perform driving operation of a host vehicle 100 (FIG. 3A, FIG. 3B) partially or entirely on the basis of a control state that is set. The vehicle control device 10 can automatically perform a series of control including at least stop control when a preceding vehicle 102 stops (FIG. 3A), stop keeping control after stopping, and start control when the preceding vehicle 102 starts to travel (FIG. 3B). The vehicle control device 10 performs the stop control, the stop keeping control, and the start control in a case where the host vehicle 100 follows the preceding vehicle 102 (FIG. 3A, FIG. 3B) in a traffic jam, that is, the start and the stop are repeated in a short period, for example.

[2. Configuration of Vehicle Control Device 10]

A configuration of the vehicle control device 10 is described with reference to FIG. 1. The vehicle control device 10 includes a control device 12, an input device group that inputs various pieces of information to the control device 12, and an output device group that operates the host vehicle 100 on the basis of the various pieces of information output from the control device 12. The input device group includes external environment sensors 14, a navigation device 16, a positioning unit 18, a communication unit 20, a vehicle body behavior sensor 22, operation sensors 24, and vehicle occupant sensors 26. The output device group includes a driving force output device 28, a braking device 30, a steering device 32, and an HMI 34.

[2.1 Configuration of Input Device Group]

The external environment sensors 14 include one or more cameras 40, one or more radars 42, and one or more LiDARs 44. The camera 40 photographs a peripheral environment of the host vehicle 100, and outputs image information to the control device 12. The radar 42 and the LiDAR 44 detect a target around the host vehicle 100, and output detection information to the control device 12. The navigation device 16 specifies the position of the host vehicle 100 by GPS or the like, generates a travel route from the position of the host vehicle 100 to a destination designated by a vehicle occupant, and outputs travel route information to the control device 12. The positioning unit 18 outputs to the control device 12, positional information that expresses the position of the host vehicle 100 specified by a GNSS 46 and an IMU 48, and map information that is stored in a map DB 50. Note that the map information in the map DB 50 has higher accuracy than that of map information in the navigation device 16, and includes various pieces of information (for example, information in each lane) that are not included in the map information in the navigation device 16. The communication unit 20 includes a communication device that receives information broadcasted by a broadcasting station, a communication device that receives information transmitted by a road-side machine that is disposed on a road, and a communication device that receives information transmitted by vehicles other than the host vehicle. The communication unit 20 outputs the received various pieces of information to the control device 12.

The vehicle body behavior sensor 22 includes various sensors that measure behavior of the host vehicle 100 (a vehicle speed, a yaw rate, or the like). The vehicle body behavior sensor 22 outputs measured various pieces of information to the control device 12. The operation sensors 24 include an automated driving switch 52, a blinker switch (turn signal switch) 54, and various sensors (not shown) that measure the operation amount of operation elements (an accelerator pedal, a brake pedal, and a steering wheel). The automated driving switch 52 outputs to the control device 12, instruction information in accordance with the vehicle occupant's operation of the switch. For example, this instruction information corresponds to instruction information that executes/stops automated driving, or instruction information that instructs the control state of the host vehicle 100 in the automated driving (see [2.2] below). The blinker switch 54 outputs to the control device 12, information in accordance with operation of a blinker lever. The information in accordance with the operation of the blinker lever corresponds to information that expresses the vehicle occupant's will regarding the movement of the host vehicle 100 in a lateral direction (execute the turning movement or cancel the movement). The vehicle occupant sensors 26 include a contact sensor 56 and a vehicle occupant camera 58. The contact sensor 56 is a capacitive sensor or a pressure sensor that is provided to the steering wheel. The contact sensor 56 detects a gripping state of the steering wheel by the vehicle occupant (contact state), and outputs detection information to the control device 12. The vehicle occupant camera 58 is provided so as to face a driver's seat. The vehicle occupant camera 58 photographs the vehicle occupant's head (face), and outputs image information to the control device 12.

[2.2 Control State of Host Vehicle 100 in Automated Driving]

Here, "the control state of the host vehicle 100 in the automated driving" instructed by the automated driving switch 52 is described. "The control state of the host vehicle 100 in the automated driving" is categorized in view of a plurality of states in accordance with the degree of the automation of the driving operation, in other words, in view of a plurality of control states in which the burden on the vehicle occupant is different. For example, the control state may be categorized in accordance with what is called an automated driving level, or a combination of the following states (1), (3), and (4) or a combination of the following states (2), (3), and (4).

(1) A state in which the vehicle control device 10 operates any one of the driving force output device 28, the braking device 30, and the steering device 32.

(2) A state in which the vehicle control device 10 operates two or more devices among the driving force output device 28, the braking device 30, and the steering device 32.

(3) A state in which gripping (contact of) the steering wheel is necessary or a state in which the gripping is unnecessary.

(4) A state in which monitoring the periphery by the vehicle occupant who is seated on the driver's seat is necessary or a state in which the monitoring is unnecessary.

[2.3 Configuration of Control Device 12]

The control device 12 is configured by an ECU. The control device 12 includes an input/output device 60, a calculation device 62, a storage device 64, and a timer 66. The input/output device 60 includes an A/D conversion circuit, a communication interface, a driver, or the like. The calculation device 62 includes a processor including a CPU or the like, for example. The calculation device 62 executes programs stored in the storage device 64, so that various functions are achieved. The various functions of the calculation device 62 are described in [2.5] below. The storage device 64 includes a RAM, a ROM, or the like. The storage device 64 stores various programs and numerical information such as a threshold that is used in a process performed by the calculation device 62. The timer 66 measures various kinds of time.

[2.4 Configuration of Output Device Group]

The driving force output device 28 includes a driving force output ECU and an actuator (including a traction motor, a throttle valve, or the like) to be controlled by the driving force output ECU. The driving force output device 28 adjusts driving force in accordance with the vehicle occupant's operation of the accelerator pedal or instruction information (driving instruction) that is output from the control device 12.

The braking device 30 includes a braking ECU and an actuator (including a brake actuator or the like) to be controlled by the braking ECU. The braking device 30 adjusts braking force in accordance with the vehicle occupant's operation of the brake pedal or instruction information (braking instruction) that is output from the control device 12.

The steering device 32 includes an electric power steering (EPS) ECU and an actuator (including an EPS actuator or the like) to be controlled by the EPS ECU. The steering device 32 adjusts the steering amount in accordance with the vehicle occupant's operation of the steering wheel or instruction information (steering instruction) that is output from the control device 12.

The HMI 34 includes a display 70 and a speaker 72. The display 70 outputs video information in accordance with instruction information (notification instruction) that is output from the control device 12. The speaker 72 outputs audio information in accordance with the instruction information (notification instruction) that is output from the control device 12.

[2.5 Various Functions of Calculation Device 62]

Figure 2:
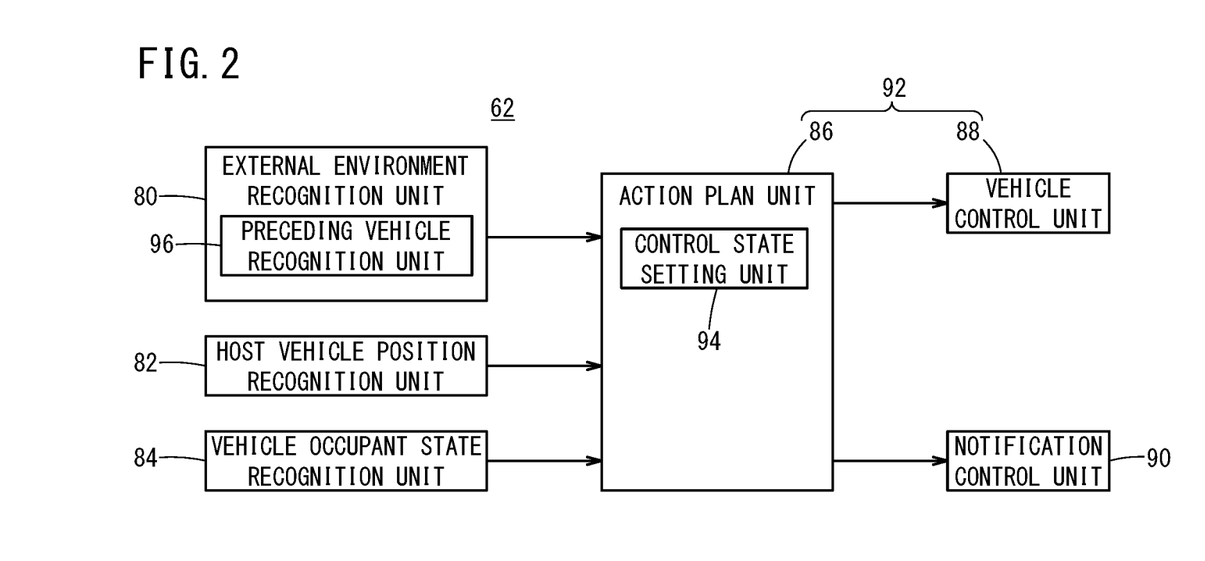
FIG. 2 is a function block diagram of a calculation device.

The various functions achieved by the calculation device 62 are described with reference to FIG. 2. The calculation device 62 functions as an external environment recognition unit 80, a host vehicle position recognition unit 82, a vehicle occupant state recognition unit 84, an action plan unit 86, a vehicle control unit 88, and a notification control unit 90. In the present embodiment, the action plan unit 86 and the vehicle control unit 88 are collectively referred to as a travel control unit 92.

The external environment recognition unit 80 recognizes a state around the host vehicle 100 on the basis of the image information and the detection information output from the external environment sensors 14. The external environment recognition unit 80 includes a preceding vehicle recognition unit 96 as a function that recognizes the preceding vehicle 102 (FIG. 3A, FIG. 3B) in front of the host vehicle 100. The preceding vehicle recognition unit 96 recognizes the preceding vehicle 102 and behavior of the preceding vehicle 102. The host vehicle position recognition unit 82 recognizes the position of the host vehicle 100 on the basis of the positional information and the map information output from the positioning unit 18. The vehicle occupant state recognition unit 84 recognizes the gripping state of the steering wheel by the vehicle occupant (whether the vehicle occupant is in contact with the steering wheel) on the basis of the detection information output from the contact sensor 56. In addition, the vehicle occupant state recognition unit 84 recognizes a periphery monitoring state by the vehicle occupant (whether the vehicle occupant watches the front, or whether the vehicle occupant's eyes are open) on the basis of the image information output from the vehicle occupant camera 58.

The action plan unit 86 generates a local map (dynamic map) that includes static information and dynamic information around the host vehicle 100 on the basis of recognition result from the external environment recognition unit 80 and the host vehicle position recognition unit 82. Then, the action plan unit 86 decides the optimum action on the basis of the local map and the state of the host vehicle 100 (a vehicle speed, a steering angle, and a position), and calculates the travel speed (or an acceleration/deceleration) to perform the action and generates a travel trajectory.

The action plan unit 86 also functions as a control state setting unit 94 that selects one control state from the control states in which the burden on the vehicle occupant is different as described above in [2.2], and sets the selected control state. The control state setting unit 94 temporarily stores the latest control state in the storage device 64. The action plan unit 86 determines the latest control state stored in the storage device 64 as the current control state, and causes the output device group to perform the control within the range allowed in that control state.

The vehicle control unit 88 calculates the acceleration/deceleration in order to cause the host vehicle 100 to travel at the travel speed calculated by the action plan unit 86, and the steering angle in order to cause the host vehicle 100 to travel along the travel trajectory generated by the action plan unit 86. Note that if the action plan unit 86 calculates the acceleration/deceleration, the vehicle control unit 88 does not need to calculate the acceleration/deceleration. The vehicle control unit 88 outputs instruction information about the acceleration/deceleration and the steering angle to the driving force output device 28, the braking device 30, and the steering device 32 through the input/output device 60. If the notification is necessary in accordance with the action decided by the action plan unit 86, the notification control unit 90 outputs the instruction information expressing notification contents to the HMI 34 through the input/output device 60.

[3. Process Performed in Vehicle Control Device 10]

Figure 4:
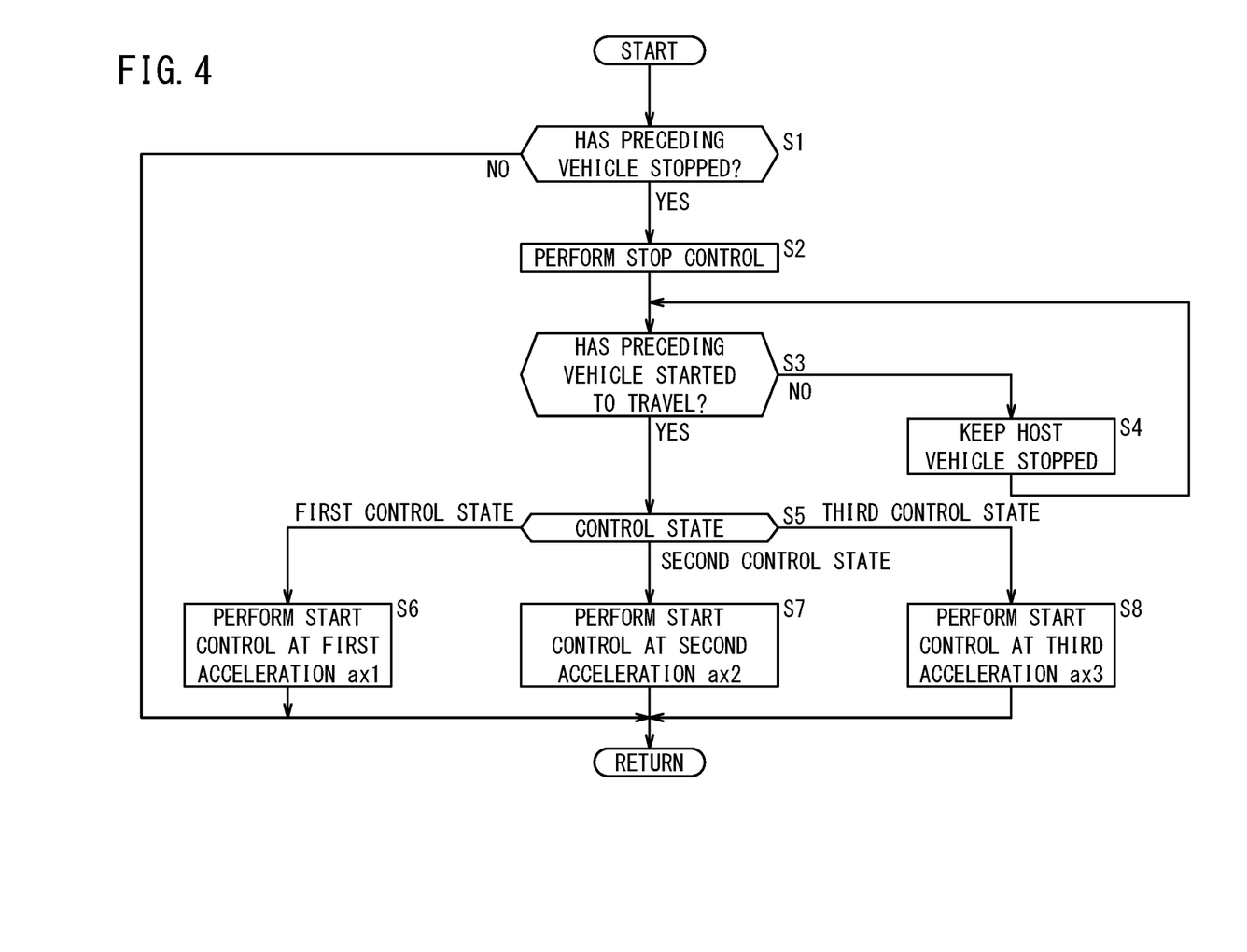
FIG. 4 is a flowchart of a process performed in the vehicle control device.

A process that is performed in the vehicle control device 10 is described with reference to FIG. 4. The process in FIG. 4 is performed at predetermined time intervals in a case where the control state in which the stop and the start of the host vehicle 100 are automatically performed is set by operating the automated driving switch 52. Moreover, in the process in FIG. 4, the input device group described in [2.1] acquires various pieces of information periodically. Furthermore, the external environment recognition unit 80, the host vehicle position recognition unit 82, and the vehicle occupant state recognition unit 84 perform the recognition process periodically.

Note that in the description of the process illustrated in FIG. 4, it is assumed that three control states, that is, a first control state to a third control state can be set as the control state of the host vehicle 100. In addition, the burden on the vehicle occupant is the smallest, in other words, the degree of automation is the highest in the first control state, followed by the second control state and the third control state in this order. One example of each control state is described in [4] below.

In step S1, the action plan unit 86 determines whether the preceding vehicle 102 has stopped on the basis of a recognition result from the preceding vehicle recognition unit 96. If the preceding vehicle 102 has stopped (step S1: YES), that is, if the behavior of the preceding vehicle 102 has changed from a travelling state to a stopped state, the process advances to step S2. On the other hand, if the preceding vehicle 102 has not stopped (step S1: NO), that is, if the preceding vehicle 102 continues traveling, the process is terminated once.

In step S2, the action plan unit 86 generates the travel speed and the travel trajectory so as to perform the stop control. The vehicle control unit 88 outputs the instruction information in accordance with the stop control to the driving force output device 28, the braking device 30, and the steering device 32. After step S2, the process advances to step S3.

In step S3, the action plan unit 86 determines whether the preceding vehicle 102 has started to travel on the basis of the recognition result from the preceding vehicle recognition unit 96. If the preceding vehicle 102 has started to travel (step S3: YES), that is, if the behavior of the preceding vehicle 102 has changed from the stopped state to the travelling state, the process advances to step S5. On the other hand, if the preceding vehicle 102 has not started to travel (step S3: NO), that is, if the preceding vehicle 102 is kept stopped, the process advances to step S4.

In step S4, the action plan unit 86 determines that it is necessary to keep the host vehicle 100 stopped. The vehicle control unit 88 outputs the instruction information to the braking device 30. The braking device 30 keeps the operation for the brake. After step S4, the process returns to step S3.

In step S5, the action plan unit 86 determines the latest control state that is stored in the storage device 64. If the control state is the first control state (step S5: first control state), the process advances to step S6. If the control state is the second control state (step S5: second control state), the process advances to step S7. If the control state is the third control state (step S5: third control state), the process advances to step S8.

In step S6, the travel control unit 92 (action plan unit 86, vehicle control unit 88) obtains first acceleration ax1 by using an acceleration table 120 (FIG. 5) stored in the storage device 64. In the acceleration table 120, the first acceleration ax1 is set in accordance with an acceleration ay of the preceding vehicle 102. Then, the travel control unit 92 outputs the instruction information to the driving force output device 28 and the braking device 30 such that the start control is performed at the first acceleration ax1. The driving force output device 28 performs acceleration operation, and the braking device 30 performs brake cancel operation.

Figure 5:
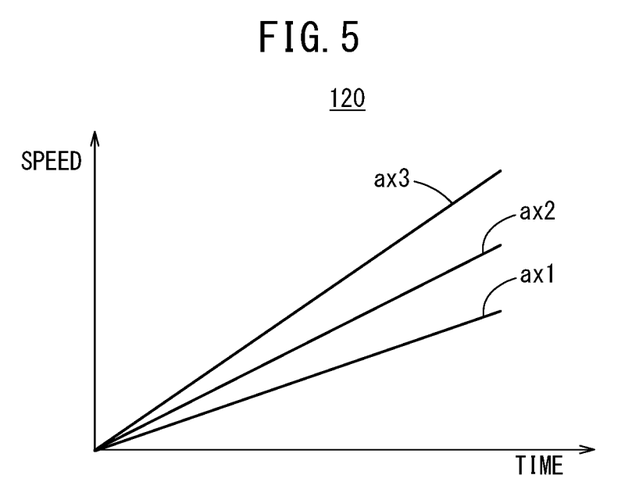
FIG. 5 is an explanatory diagram for describing acceleration in the start control.

In step S7, the travel control unit 92 obtains a second acceleration ax2 by using the acceleration table 120. In the acceleration table 120, the second acceleration ax2 (>first acceleration ax1) is set in accordance with the acceleration ay of the preceding vehicle 102. The travel control unit 92 outputs the instruction information to the driving force output device 28 and the braking device 30 such that the start control is performed at the second acceleration ax2. The driving force output device 28 performs the acceleration operation, and the braking device 30 performs the brake cancel operation. The vehicle control device 10 can increase the vehicle speed more quickly in the start control with the second control state than in the start control with the first control state.

In step S8, the travel control unit 92 obtains a third acceleration ax3 by using the acceleration table 120. In the acceleration table 120, the third acceleration ax3 (>second acceleration ax2) is set in accordance with the acceleration ay of the preceding vehicle 102. The travel control unit 92 outputs the instruction information to the driving force output device 28 and the braking device 30 such that the start control is performed at the third acceleration ax3. The driving force output device 28 performs the acceleration operation, and the braking device 30 performs the brake cancel operation. The vehicle control device 10 can increase the vehicle speed more quickly in the start control with the third control state than in the start control with the second control state.

[4. Control State and Permission and Non-Permission of Automated Start Control]

Figure 6:
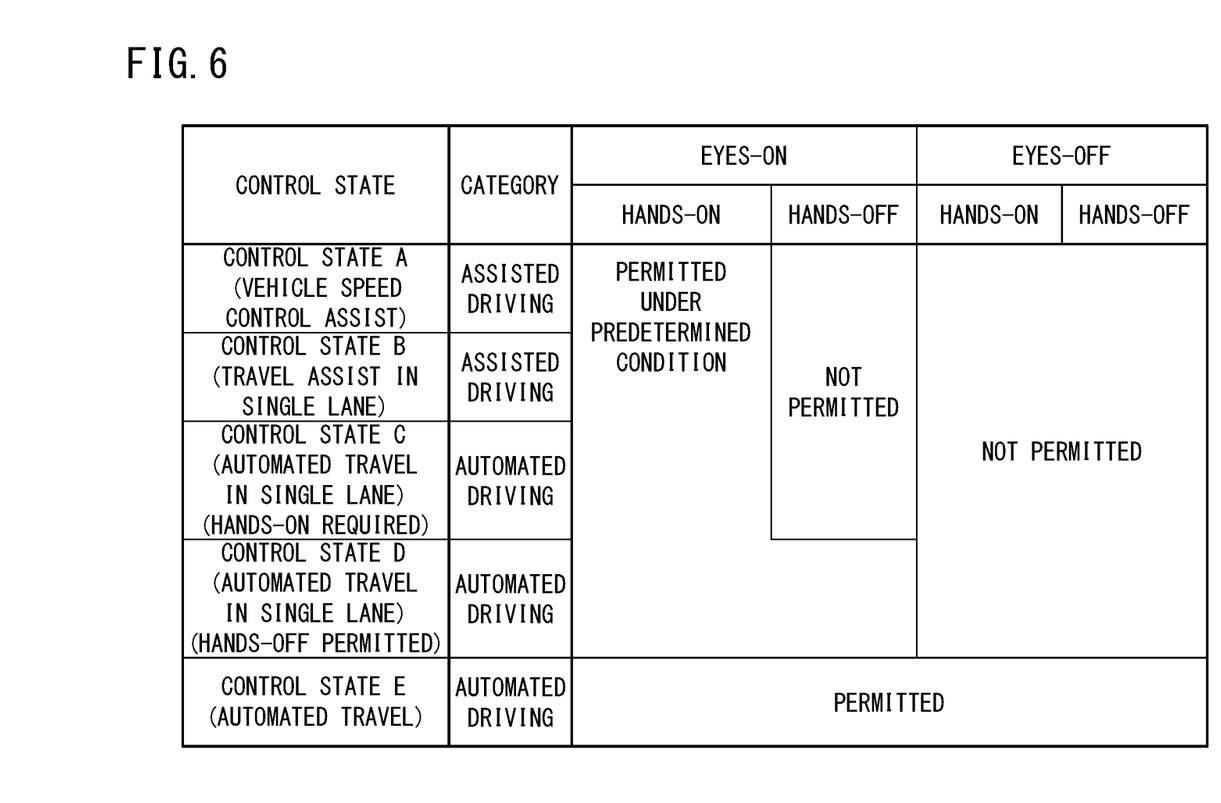
FIG. 6 is an explanatory diagram illustrating permission and non-permission of automated start control for each control state.

With reference to FIG. 6, the control state and the permission and non-permission of automated start control are described. Here, a plurality of control states in which the vehicle control device 10 controls/assists the operation in a longitudinal direction of the host vehicle 100, that is, the driving force output and the braking are assumed, and moreover, the permission and non-permission of the automated start control in each control state are described. The assumed control states include the following (1) to (5) control states A to E. In the control states A to E, the burden on the vehicle occupant in the driving is the smallest in the control state E, followed by D, C, B, and A in this order. In other words, in the control states A to E, the degree of automation is the lowest in the control state A, followed by B, C, D, and E in this order.

(1) Control state A (vehicle speed control assist): the control device 12 assists the driving force output control and the braking control. Hands-off is not permitted, and eyes-off is not permitted.

(2) Control state B (travel assist in single lane): the control device 12 assists the driving force output control, the braking control, and steering control. Hands-off is not permitted, and eyes-off is not permitted.

(3) Control state C (automated travel in single lane): the control device 12 performs the driving force output control, the braking control, and the steering control. Hands-off is not permitted, and eyes-off is not permitted.

(4) Control state D (automated travel in single lane): the control device 12 performs the driving force output control, the braking control, and the steering control. Hands-off is permitted, but eyes-off is not permitted.

(5) Control state E (automated travel): the control device 12 performs the driving force output control, the braking control, and the steering control. Hands-off is permitted, and eyes-off is permitted.

In FIG. 6, the term hands-on means a state in which the vehicle occupant (driver) on the driver's seat grips the steering wheel, and the term hands-off means a state in which the driver does not grip the steering wheel. In addition, the term eyes-on means the state in which the driver monitors a periphery (ahead) of the host vehicle 100, and the term eyes-off means the state in which the driver does not monitor the periphery (ahead) of the host vehicle 100.

The vehicle occupant state recognition unit 84 recognizes the gripping state (contact state) of the steering wheel by the driver on the basis of the detection information output from the contact sensor 56, and recognizes whether the driver is in the hands-on state or the hands-off state. In addition, the vehicle occupant state recognition unit 84 recognizes the direction of the driver's face and line of sight on the basis of the image information output from the vehicle occupant camera 58, and recognizes whether the driver is in the eyes-on state or the eyes-off state.

In the case where any of the control states A to C is set, if eyes-on and hands-on states are recognized, the travel control unit 92 permits the automated start control and if the eyes-off or hands-off state is recognized, the travel control unit 92 does not permit the automated start control. In the case where the control state D is set, if the eyes-on state is recognized, the travel control unit 92 permits the automated start control and if the eyes-off state is recognized, the travel control unit 92 does not permit the automated start control. In the case where the control state E is set, the travel control unit 92 permits the automated start control regardless of the hands-on or hands-off state, or the eyes-on or eyes-off state. In the case where the automated start control is not permitted, even if the preceding vehicle recognition unit 96 has recognized the start behavior of the preceding vehicle 102, the travel control unit 92 does not perform the start control of the host vehicle 100.

In the description made with reference to FIG. 4, it is assumed that the first to third control states can be set as the control state of the host vehicle 100. To the first to third control states, the control states A to E can be applied. For example, the control state E, the control state D, and the control state C in FIG. 6 may be used as the first state, the second state, and the third state, respectively. In this case, in step S7 illustrated in FIG. 4, the travel control unit 92 performs the start control on the condition that the eyes-on state is recognized. In addition, in step S8 illustrated in FIG. 4, the travel control unit 92 performs the start control on the condition that the hands-on state and the eyes-on state are recognized.

Alternatively, the control state D, the control state C, and the control state B may be used as the first control state, the second control state, and the third control state, respectively. Further alternatively, the control state E, the control state C, and the control state B may be used as the first control state, the second control state, and the third control state, respectively.

[5. Modifications]

The aforementioned embodiment can be modified variously such that a part of the functions is exchanged or another function is added. A part of modification is hereinafter described.

[5.1 First Modification]

Here, it is assumed that the control state E, the control state D, and the control state C illustrated in FIG. 6 are used as the first control state, the second control state, and the third control state, respectively. In the case where the second control state (control state D) is set, the driver may look aside while the host vehicle 100 is stopped. In the case where the third control state (control state C) is set, the driver may take his hands off from the steering wheel or look aside while the host vehicle 100 is stopped. In these cases, if the preceding vehicle 102 starts to travel, the vehicle occupant state recognition unit 84 recognizes hands-off or eyes-off in step S7 and step S8 in FIG. 6.

In view of such a situation, the following process may be performed in step S7 and step S8 in FIG. 4. That is to say, in step S7, in the case where the second control state is set by the control state setting unit 94 and the eyes-off state is recognized by the vehicle occupant state recognition unit 84, the notification control unit 90 outputs the instruction information to the HMI 34 (display 70, speaker 72). In addition, in the case where the third control state is set by the control state setting unit 94 and the hands-off state and eyes-off state are recognized by the vehicle occupant state recognition unit 84, the notification control unit 90 outputs the instruction information to the HMI 34 (display 70, speaker 72). The HMI 34 warns the driver to go into the hands-on state and eyes-on state. Then, when the vehicle occupant state recognition unit 84 has recognized the hands-on and eyes-on state, the travel control unit 92 performs the start control.

[5.2 Second Modification]

Here, it is assumed that the control state E illustrated in FIG. 6 is used as the first control state and two of the control states B to D in FIG. 6 are used as the second and third control states. Even if the first control state (control state E) is set, the driver may perform the periphery monitoring while the host vehicle 100 is stopped. In such a case, it is unnecessary to suppress the first acceleration ax1 in the start control compared with when the driver does not perform the periphery monitoring.

Thus, the following process may be performed in step S6 in FIG. 4. That is to say, in the case where the first control state is set by the control state setting unit 94 and the eyes-on state is recognized by the vehicle occupant state recognition unit 84, the travel control unit 92 performs the start control at a first acceleration ax1" that is higher than a first acceleration ax1'. The first acceleration ax1' is the acceleration in the case where the driver does not perform the periphery monitoring. The first acceleration ax1" may be equal to the second acceleration ax2 in the second control state, equal to the third acceleration ax3 in the third control state, or any other value.

[5.3 Third Modification]

Here, it is assumed that the control state D illustrated in FIG. 6 is used as the second control state. In the case where the second control state is set by the control state setting unit 94 and the hands-on state is recognized by the vehicle occupant state recognition unit 84, the travel control unit 92 may perform the start control at a second acceleration ax2" that is higher than a second acceleration ax2'. The second acceleration ax2' is the acceleration in the case where hands-on is not recognized.

[5.4 Other Modifications]

In the above embodiment, the first to third control states are assumed; however, another control state may be provided. In the latter case, the acceleration ax in the start control may be decreased as the vehicle occupant in the control state is burdened less.

[6. Technical Concept Obtained from Embodiment]

The technical concept that is obtained from the above embodiment and modifications is hereinafter described.

An aspect of the present invention is the vehicle control device 10 that performs the driving operation of the host vehicle 100 partially or entirely on the basis of the control states that are set, the vehicle control device 10 including: the preceding vehicle recognition unit 96 configured to recognize the preceding vehicle 102 ahead of the host vehicle 100 and the behavior of the preceding vehicle 102; the travel control unit 92 configured to, if the preceding vehicle recognition unit 96 recognizes that the preceding vehicle 102 starts to travel, perform the start control of the host vehicle 100; and the control state setting unit 94 configured to select and set one of the control states in which the burdens on the vehicle occupant are different, wherein in the start control, the travel control unit 92 is configured to make the first acceleration ax1 in the first control state (for example, control state E) set by the control state setting unit 94, lower than the second acceleration ax2 in the second control state (for example, control state D) set by the control state setting unit 94, the burden on the vehicle occupant in the second control state being larger than that in the first control state.

By the above configuration, the first acceleration ax1 in the case where the burden on the vehicle occupant is small (the degree of automation is high) is made lower than the second acceleration ax2 in the case where the burden on the vehicle occupant is large (the degree of automation is small). Thus, the host vehicle 100 can start to travel at the acceleration in accordance with the control state of the host vehicle 100. In the case of the control state in which the burden on the vehicle occupant is small, the vehicle occupant may see other directions than the front and may put his hand off from the steering wheel. Even in these cases, the travel distance of the host vehicle 100 can be suppressed by decreasing the first acceleration ax1, and the time necessary for the vehicle occupant to start to perform the periphery monitoring and grip the steering wheel can be secured.

In the above aspect, in the start control, the travel control unit 92 may be configured to make the third acceleration ax3 in the third control state (for example, control state C) set by the control state setting unit 94, higher than the second acceleration ax2 in the second control state set by the control state setting unit 94, the burden on the vehicle occupant in the third control state being larger than that in the second control state (for example, control state D)."

By the above configuration, even in the case where three or more control states can be set for the host vehicle 100, the host vehicle 100 can start to travel at the acceleration in accordance with the control state of the host vehicle 100.

In the above aspect, the vehicle control device 10 may further include the vehicle occupant state recognition unit 84 configured to recognize the contact state of the steering wheel by the vehicle occupant and recognize the periphery monitoring state by the vehicle occupant, wherein: the third control state may be the control state in which the vehicle occupant needs to grip the steering wheel; and in the case where the third control state is set by the control state setting unit 94 and the vehicle occupant state recognition unit 84 recognizes that the vehicle occupant is not in contact with the steering wheel or in the case where the third control state is set by the control state setting unit 94 and the vehicle occupant state recognition unit 84 recognizes that the vehicle occupant does not perform the periphery monitoring, the travel control unit 92 may not perform the start control of the host vehicle 100 even if the preceding vehicle recognition unit 96 has recognized the start of the preceding vehicle 102.

By the above configuration, the vehicle occupant can deal with the emergency situation, and it is unnecessary to secure the time for the vehicle occupant to start to grip the steering wheel. By not decreasing the first acceleration ax1, the host vehicle 100 can start to travel in accordance with the vehicle occupant's request.

In the above aspect, the vehicle control device 10 may further include the vehicle occupant state recognition unit 84 configured to recognize the contact state of the steering wheel by the vehicle occupant and recognize the periphery monitoring state by the vehicle occupant; and the notification control unit 90 configured to perform the notification control for the vehicle occupant, wherein the second control state may be the control state in which the vehicle occupant needs to perform periphery monitoring; the third control state may be the control state in which the vehicle occupant needs to grip the steering wheel and perform the periphery monitoring; and in the case where the second control state or the third control state is set by the control state setting unit 94, if the vehicle occupant state recognition unit 84 recognizes that the vehicle occupant is not in contact with the steering wheel or the vehicle occupant state recognition unit 84 recognizes that the vehicle occupant does not perform the periphery monitoring, the notification control unit 90 may warn the vehicle occupant (first modification).

By the above configuration, the start control can be performed correctly.

In the above aspect, the vehicle control device 10 may further include the vehicle occupant state recognition unit 84 configured to recognize the periphery monitoring state by the vehicle occupant, wherein in the case where the first control state is set by the control state setting unit 94 and the vehicle occupant state recognition unit 84 recognizes that the vehicle occupant perform the periphery monitoring, the travel control unit 92 may perform the start control at the first acceleration ax1" that is higher than the first acceleration ax1' that is in the case where the vehicle occupant does not perform the periphery monitoring (second modification).

By the above configuration, the vehicle occupant can deal with the emergency situation, and it is unnecessary to secure the time for the vehicle occupant to start to perform the periphery monitoring. By setting the first acceleration ax1", the host vehicle 100 can start to travel in accordance with the vehicle occupant's request.

In the above aspect, the vehicle control device 10 may further include the vehicle occupant state recognition unit 84 configured to recognize the contact state of the steering wheel by the vehicle occupant, wherein in the case where the second control state is set by the control state setting unit 94 and the vehicle occupant state recognition unit 84 recognizes that the vehicle occupant is in contact with the steering wheel, the travel control unit 92 may perform the start control at the second acceleration ax2" that is higher than the second acceleration ax2' that is in the case where the contact with the steering wheel is not recognized (third modification).

By the above configuration, the vehicle occupant can deal with the emergency situation, and it is unnecessary to secure the time for the vehicle occupant to start to grip the steering wheel. By setting the second acceleration ax2", the host vehicle 100 can start to travel in accordance with the vehicle occupant's request.

Note that the vehicle control device according to the present invention is not limited to the above embodiment, and can employ various configurations without departing from the concept of the present invention.

What is claimed is:

1. A vehicle control device that performs driving operation of a host vehicle partially or entirely on a basis of a plurality of control states that are set, the vehicle control device comprising:
   a preceding vehicle recognition unit configured to recognize a preceding vehicle ahead of the host vehicle and behavior of the preceding vehicle;
   a travel control unit configured to, if the preceding vehicle recognition unit recognizes that the preceding vehicle starts to travel, perform start control of the host vehicle;
   a control state setting unit configured to select and set one of the control states in which burdens on a vehicle occupant are different; and
   a vehicle occupant state recognition unit configured to recognize a contact state of a steering wheel by the vehicle occupant,
   wherein in the start control, the travel control unit is configured to make an acceleration in a first control state set by the control state setting unit, lower than an acceleration in a second control state set by the control state setting unit, the burden on the vehicle occupant in the second control state being larger than that in the first control state
   in the start control, the travel control unit is configured to make an acceleration in a third control state set by the control state setting unit, higher than the acceleration in the second control state set by the control state setting unit, the burden on the vehicle occupant in the third control state being larger than that in the second control state,
   in the case where the second control state is set by the control state setting unit and the vehicle occupant state recognition unit recognizes that the vehicle occupant is in contact with the steering wheel, the travel control unit performs the start control at an acceleration that is higher than an acceleration in a case where the contact with the steering wheel is not recognized, and
   wherein the second control state is the control state in which the vehicle occupant does not need to grip the steering wheel.

2. The vehicle control device according to claim 1, wherein the vehicle occupant state recognition unit is configured to recognize a periphery monitoring state by the vehicle occupant,
   wherein the third control state is the control state in which the vehicle occupant needs to grip the steering wheel, and
   in a case where the third control state is set by the control state setting unit and the vehicle occupant state recognition unit recognizes that the vehicle occupant is not in contact with the steering wheel or in a case where the third control state is set by the control state setting unit and the vehicle occupant state recognition unit recognizes that the vehicle occupant does not perform periphery monitoring, the travel control unit does not perform the start control of the host vehicle even if the preceding vehicle recognition unit has recognized start of the preceding vehicle.

3. The vehicle control device according to claim 1, further comprising:
   a notification control unit configured to perform notification control for the vehicle occupant, wherein the vehicle occupant state recognition unit is configured to recognize a periphery monitoring state by the vehicle occupant; and the second control state is the control state in which the vehicle occupant needs to perform periphery monitoring, the third control state is the control state in which the vehicle occupant needs to grip the steering wheel and perform the periphery monitoring, and in a case where the second control state or the third control state is set by the control state setting unit, if the vehicle occupant state recognition unit recognizes that the vehicle occupant is not in contact with the steering wheel or that the vehicle occupant does not perform the periphery monitoring, the notification control unit warns the vehicle occupant.

4. The vehicle control device according to claim 1, wherein the vehicle occupant state recognition unit is configured to recognize a periphery monitoring state by the vehicle occupant, wherein in a case where the first control state is set by the control state setting unit and the vehicle occupant state recognition unit recognizes that the vehicle occupant performs periphery monitoring, the travel control unit performs the start control at an acceleration that is higher than an acceleration in a case where the vehicle occupant does not perform the periphery monitoring.

* * * * *